(12) United States Patent
Van Den Berg

(10) Patent No.: US 9,678,198 B2
(45) Date of Patent: Jun. 13, 2017

(54) MILKING IMPLEMENT

(75) Inventor: Karel Van Den Berg, Bleskensgraaf (NL)

(73) Assignee: LELY PATENT N.V., Maassluis (NL)

( * ) Notice: Subject to any disclaimer, the term of this patent is extended or adjusted under 35 U.S.C. 154(b) by 259 days.

(21) Appl. No.: 12/758,082

(22) Filed: Apr. 12, 2010

(65) Prior Publication Data

US 2010/0192862 A1 Aug. 5, 2010

Related U.S. Application Data

(63) Continuation of application No. PCT/NL2008/000203, filed on Sep. 18, 2008.

(30) Foreign Application Priority Data

Oct. 12, 2007 (NL) .................................... 1034502

(51) Int. Cl.
*A01J 5/007* (2006.01)
*A01J 5/017* (2006.01)
*G01S 7/481* (2006.01)
*G01S 17/06* (2006.01)

(52) U.S. Cl.
CPC ............ *G01S 7/4811* (2013.01); *A01J 5/007* (2013.01); *A01J 5/017* (2013.01); *A01J 5/0175* (2013.01); *G01S 17/06* (2013.01)

(58) Field of Classification Search
USPC ...................... 119/14.01, 14.08, 14.14, 14.18
See application file for complete search history.

(56) References Cited

U.S. PATENT DOCUMENTS

| | | | | |
|---|---|---|---|---|
| 4,805,557 | A * | 2/1989 | van der Lely et al. .... | 119/14.08 |
| 4,867,103 | A * | 9/1989 | Montalescot et al. ..... | 119/14.08 |
| 5,379,721 | A * | 1/1995 | Dessing et al. ............ | 119/14.08 |
| 5,934,220 | A * | 8/1999 | Hall et al. .................. | 119/14.08 |
| 6,227,142 | B1  | 5/2001 | Birk | |
| 6,431,116 | B1 * | 8/2002 | Nilsson ....................... | 119/14.08 |
| 6,575,116 | B1 * | 6/2003 | Birk et al. ................. | 119/14.48 |
| 6,647,919 | B2  | 11/2003 | Vijverberg | |
| 6,860,226 | B2 * | 3/2005 | Nilsson ....................... | 119/14.02 |
| 7,146,928 | B2 * | 12/2006 | Ealy et al. ................. | 119/14.08 |
| 7,246,571 | B2 * | 7/2007 | Van Den Berg et al. . | 119/14.08 |

FOREIGN PATENT DOCUMENTS

| | | |
|---|---|---|
| DE | 10111729 A1 | 9/2002 |
| NL | 8602699 A | 5/1988 |
| NL | 1018563 C | 3/2003 |
| WO | WO 97/15900 * | 5/1997 |

\* cited by examiner

*Primary Examiner* — David Parsley
(74) *Attorney, Agent, or Firm* — Hoyng Rokh Monegier LLP; Ramin Amirsehhi; David P. Owen

(57) ABSTRACT

The present invention provides for a milking implement for automatically milking a dairy animal. The implement includes a measuring device for measuring a position of an object such as at least one of a displaceable element of the milking implement and a teat of the dairy animal, and a control device for controlling at least the measuring device. The control device is configured to take at least one measurement, using the measuring device, on at least one point on the object in order to obtain a position information regarding the object, compare the obtained position information with a known position information regarding the object, and calibrate the measuring device on the basis of the comparison between the obtained position information and the known position information.

15 Claims, 2 Drawing Sheets

MILKING IMPLEMENT

CROSS REFERENCE TO RELATED APPLICATIONS

This application claims priority from Netherlands application number 1034502 filed on Oct. 12, 2007, and is a continuation of PCT application number PCT/NL2008/000203, the contents of which are hereby incorporated by reference in their entirety.

BACKGROUND OF THE INVENTION

1. Field of the Invention

The invention relates generally to a milking implement for automatically milking a dairy animal and more particularly to measuring and controlling devices to improve such implements.

2. Description of the Related Art

Milking implements for dairy animals are known and comprise a robot arm provided with a number of teat cups which may be connected to the udder of a dairy animal. Since each animal has its own size and may be located in each case at another position relative to the milking implement, there is provided a position measuring device for determining a position of an udder and/or one or more of the teats of the animal. A milking implement comprising such a position measuring device is, for example, known from NL1018563, hereby incorporated by reference.

However, there is a need to provide improved measuring devices for milking implements, such as improved calibration for these devices.

BRIEF SUMMARY OF THE INVENTION

The present invention addresses these problems by providing a manner of calibration.

In order to achieve this object, the milking implement according to the invention comprises a measuring device for measuring a position of at least one teat of the dairy animal and a control device for controlling at least the measuring device, wherein the control device is arranged to
a. perform by means of the measuring device at least one measurement on at least one point on an object in order to obtain a position information regarding the object,
b. compare the obtained position information with a known position information regarding the object, and
c. calibrate the measuring device on the basis of the comparison between the obtained position information and the known position information.

The object may comprise any desired object, but there is preferably used an already existing displaceable element of the milking implement, such as a teat cup, an assembly of teat cups, a spraying robot for spraying for example a disinfecting liquid, etc. In general, such an object will be present with a certain regularity in an observation area of the milking implement, so that at that moment a, for example, periodic calibration can be performed, while a normal operation of the milking implement need hardly or not be interrupted thereby, so that the calibration can be performed frequently, if desired.

The position information may comprise any suitable data regarding, for example, a position of the object, a relative position of the object with respect to the measuring device (or a part thereof), a distance, an angle of direction, etc.

A position measuring device may be based on a variety of measuring principles, for example infrared, ultrasonic, radar, etc., and may, for example, perform distance measurements to in each case one single point, or form, for example by means of a matrix of sensors, a for example two-dimensional image.

In general, a periodic calibration of the distance measurement is desirable, since the measurement, depending on the applied measuring principle, may be sensitive of temperature, moisture, aging, contamination of components of the measuring system, etc.

Incidentally, in the context of this document, by the term calibration should not only be meant a setting or calibration of a device, but this term may also comprise a verification of a function of the measuring device. The setting or calibration of the measuring device may, incidentally, comprise any suitable setting: it is, for example, possible to adjust a parameter of a light source or sensor of the measuring device, to adjust a conversion factor, amplification factor, attenuation factor or correction factor, etc.; however, it is also possible that a position and/or orientation of one or more elements of the measuring device (for example a measuring sensor, measuring head, etc.) are/is calibrated in order to perform a correct distance or position measurement. The calibration may thus comprise any desired quantity to be measured by the measuring system or to be deduced from such a measurement, such as a distance to an object, a distance between two objects, an angle of direction of an object, etc.

An example of a position measuring device comprises a source of radiation for emitting modulated electromagnetic radiation, in particular light, a receiver device for receiving electromagnetic radiation reflected by an object in the observation area, an optical device for displaying the reflected electromagnetic radiation on the receiver device, and sensor image processing means, wherein the receiver device comprises a matrix with a plurality of rows and a plurality of columns of receivers, and wherein the sensor image processing means are arranged to determine for each of the receivers a phase difference between the emitted and the reflected electromagnetic radiation in order to calculate a distance from the receiver to the object. More precisely, the sensor image processing means calculate in this case the distance from the receiver to the part of the observation area displayed on that receiver. For the sake of convenience, the latter distance will be denoted hereinafter by distance from the receiver to an object in that observation area.

By using such a matrix of receivers and by determining for these receivers a distance to the dairy animal, like in this case by means of phase shifting of the emitted light, it is possible to obtain per observation a complete spatial image of, for example, the teat. This spatial image is in fact composed in one go, instead of by scanning. Moreover, it is not, or at least to a lesser extent than in the state of the art, distorted by movements of the entire dairy animal and/or its teat during the observation. Moreover, it is not necessary to move the milking robot, or a part thereof, to compose a complete image. This means that there is a greater reliability that the milking robot will be moved in the correct direction. All this will be explained hereinafter in further detail.

In one embodiment, the sensor image processing means are arranged to form a three-dimensional image of the observation area, in particular of an object therein. In principle, the series of measured distances will suffice, but it may be advantageous to produce also a three-dimensional image, for example for visual control. In this case, the image formed is transferred to a display screen or the like. In this case, the distance may, for example, be displayed by false colours, or the image may be rotated, etc.

It should be noted that the optical device, i.e. the lens or lenses, is an optical system which casts an image of the observation area on the receivers, and which determines from what direction measurement takes place. There may be selected a wide or narrow angle of view of the observation area. Advantageously, the optical device comprises an adjustable optical device by means of which the angle of view can be selected, such as a zoom optical device.

Below, a sensor of the milking implement according to this exemplary embodiment will briefly be explained in further detail. The source of radiation emits electromagnetic radiation. Preferably light is used for this purpose, more preferably infrared radiation, more preferably near-infrared (NIR) radiation. The fact is that, for this purpose, suitable LEDs can be used which are very easy to drive by means of an electrically controllable supply current, and which are, in addition, very compact and efficient and have a long service life. However, it would also be possible to use other sources of radiation. The advantage of (near-)infrared radiation is that the radiation does not irritate dairy animals.

The radiation is modulated, in accordance with a modulation frequency which is, of course, different from and is much lower than the frequency of the electromagnetic radiation itself. The, for example, infrared light is in this case a carrier for the modulation signal. The modulation helps to determine the phase difference of emitted and reflected radiation. Preferably, the modulation is amplitude modulation.

By means of the emitted radiation, the distance is determined by measuring a phase shift of the modulation signal, by comparing the phase of reflected radiation with the phase of reference radiation. For the latter, the emitted radiation is usually (almost) directly passed on to the receiver, anyhow with a known distance between the source and the receiver, so that the actual distance can easily be determined from the measured phase difference by applying Distance=½×wavelength×(phase difference/2pi), wherein the wavelength is that of the modulation signal. Please note that the above relation does not make allowance for unique determination of the distance which results from the fact that a phase difference, due to the periodicity, may be associated with a distance A, but also with A+n×(wavelength/2). For this reason, it may be sensible to select the wavelength of the amplitude modulation in such a manner that the distances which occur in practice are indeed uniquely determined.

Preferably, a wavelength of the amplitude modulation of the emitted light is between 1 mm and 5 m. Hereby, distances can be uniquely determined up to a maximum distance of between 0.5 mm to 2.5 m, which is associated with a modulation frequency of between 300 MHz to 60 kHz, which can be readily achieved in electric circuits for driving LEDs. It should be noted that it is also possible to choose even smaller or larger wavelengths, if desired. It is advantageous, for example, to select the wavelength in dependence on the expected to be determined distance. For example, in the milking preparation phase that distance will often be between 10 cm and 60 cm, so that a preferred wavelength range will be between 20 cm and 120 cm, and consequently a preferred frequency range will be between 1.5 MHz and 250 kHz.

In another aspect of the milking implement according to the invention, whether or not in connection with what has been mentioned above, the measuring device is arranged to perform a distance measurement using infrared light, wherein at least an infrared sensor of the measuring device is disposed in a housing having an infrared-transparent wall and wherein an optical path runs through the wall from or to the infrared sensor. In general, the milking implement is subject to moisture action by a variety of causes: cleaning of the milking implement or a part thereof by means of water or a cleaning means, moisture secreted by animals to be milked, condensation by temperature differences, etc. The housing having a wall of synthetic material offers the opportunity to shield the measuring device or at least a possibly moisture sensitive sensor or light source thereof, by means of the housing having the infrared-transparent wall.

BRIEF DESCRIPTION OF THE DRAWINGS

The features and advantages of the invention will be appreciated upon reference to the following drawings, in which.

DESCRIPTION OF ILLUSTRATIVE EMBODIMENTS

The following is a description of certain embodiments of the invention, given by way of example only and with reference to the drawings. FIGS. 1a-1e show in each case a very diagrammatic view of a measuring device, or at least a measuring element (such as a measuring head, camera or measuring sensor) thereof, and an object. The measuring device then performs in each case a distance measurement to the object, in other words a measurement of the distance between the measuring element of the measuring device and the relevant object. Incidentally, it is also possible for the measuring device to determine not only a distance, but also a position of the object relative to the measuring sensor, for example by determining an angle of direction of the object relative to the measuring sensor.

Figure 1A:
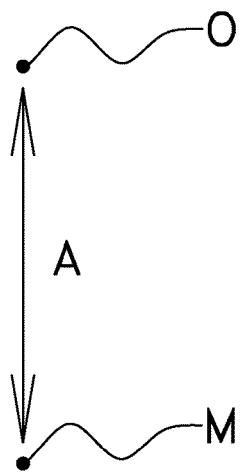
FIGS. 1A-1E are diagram top views of distance measurements between one or more sensors and one or more objects in accordance with the present invention.

FIG. 1a shows an embodiment in which the measuring sensor M measures a distance A to an object O. When the distance between the measuring sensor and the object is known (for example because it concerns a known object at a known place), the measured distance A can be compared with the known distance, and the measuring device can be calibrated on the basis of a result of the comparison.

Figure 1B:
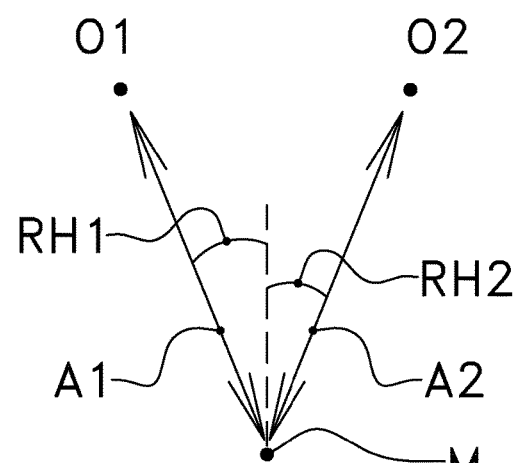

FIG. 1b shows an embodiment in which there is determined a distance to two points on one object, or on two objects which are located at a certain known distance relative to each other and which are denoted by O1 and O2, respectively. A distance A1 from the measuring sensor M to O1 and a distance A2 from the measuring sensor M to O2 is determined by the measuring system. Preferably, there is also determined an angle of direction RH1 with respect to a direction of O1 relative to M and an angle of direction RH2 of O2 relative to M. By relating the measured distances, either or not in combination with the angles of direction, to one or more known parameters, such as a known distance between O1 and O2, a known distance from the measuring head to O1 or O2, a known angle of direction, a known orientation of O1 and O2 relative to the measuring sensor, etc., it is possible to calibrate the measuring device, for example the distance measurement, the angle measurement or a combination thereof. By using two objects or two points on one and the same object, there may be created more possibilities in comparison with the situation shown in FIG.

1a. By measuring both a distance and an angle of direction, there may be provided many possibilities of calibration.

Figure 1C:
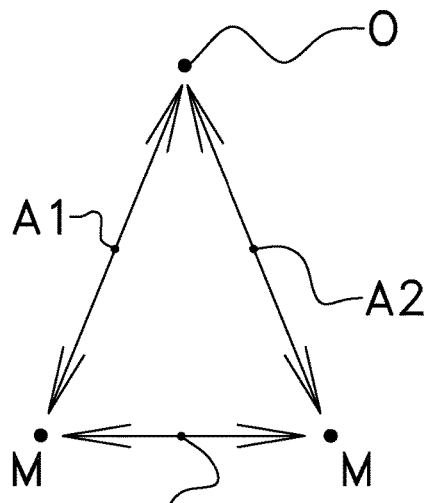

FIG. 1c shows an arrangement in which a first measurement M1 is performed to determine a distance A1 from the measurement sensor M to the object O. Subsequently, the measuring sensor is displaced over a certain distance MV relative to the object, after which a distance measurement A2 from the measuring head (now denoted by M2) to the object O is performed again. Analogously to the situation described with reference to FIG. 1b, it is also possible to measure an angle of direction RH1, RH2. An angle of direction of the displacement MV of the measuring head from M1 to M2 may also be taken in. When a few data are known (for example, a known distance between M1 and M2, one or more known angles of direction, etc.) it is possible to make, on the basis thereof by means of well-known geometric calculations, a comparison between known (angle and/or distance) data and measured data or (angle and/or distance) data determined from one or more measurements, on the basis of which it is possible to calibrate one or more parameters on the measuring device.

Figure 1D:
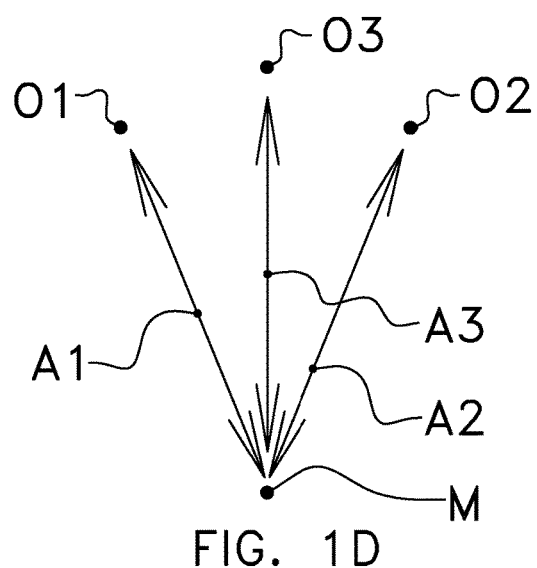

FIG. 1d shows an arrangement in which it is possible to determine, by means of a measuring sensor M1, a distance A1, A2 and A3, respectively, to objects O1, O2 and O3 (which may comprise, for example, individual objects in a known mutual positioning thereof, or three points on a single, known object). Also in this case it is possible to measure angles of direction. The known position information may, for example, comprise a known mutual position relation between O1, O2 and O3. By using three objects or three points on one object, it is possible to deduce a variety of geometric parameters, from one single measurement of, for example, the three distances, preferably in combination with measured angles of direction.

Figure 1E:
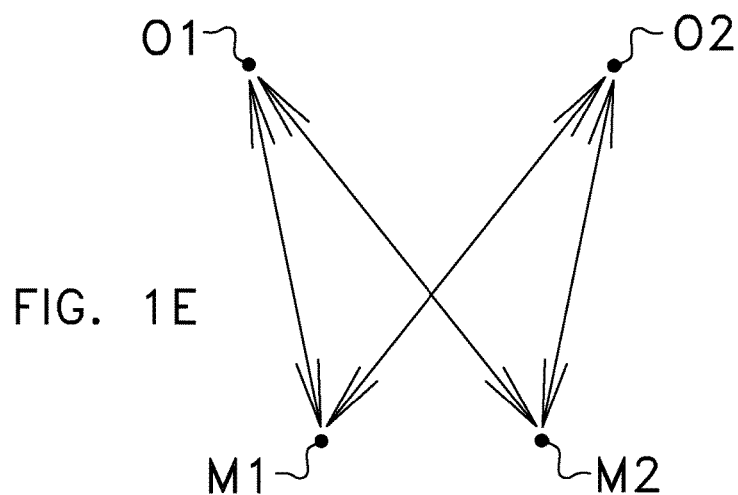

FIG. 1e shows a configuration in which two measurements are performed from respective positions of the measuring sensor, denoted by M1 and M2, and in which each measurement is performed to two objects which are in a known positioning relative to each other, or to two points on one and the same object. Also in this case it is possible to measure angles of direction. When now, for example, a distance between O1 and O2 and a distance between M1 and M2 are known, it is possible to relate the measured values and the known distances to each other, and to perform calibrations on the basis thereof.

Instead of or besides one or more of the above-mentioned embodiments, it is also possible to calibrate an angle of direction. In that case, the known position information may comprise a known angle of direction of one or a plurality of objects or a plurality of points on an object, and the calibration may be performed by comparing a measured angle of direction with the known angle of direction or angles of direction, by means of which it is, for example, possible to obviate a tolerance in vertical and/or horizontal direction of orientation of the measuring device (or at least a measuring sensor thereof).

The principles shown in this document may be applied in any desired direction or orientation and may, but need not necessarily, be located, in one single plane.

Figure 2:
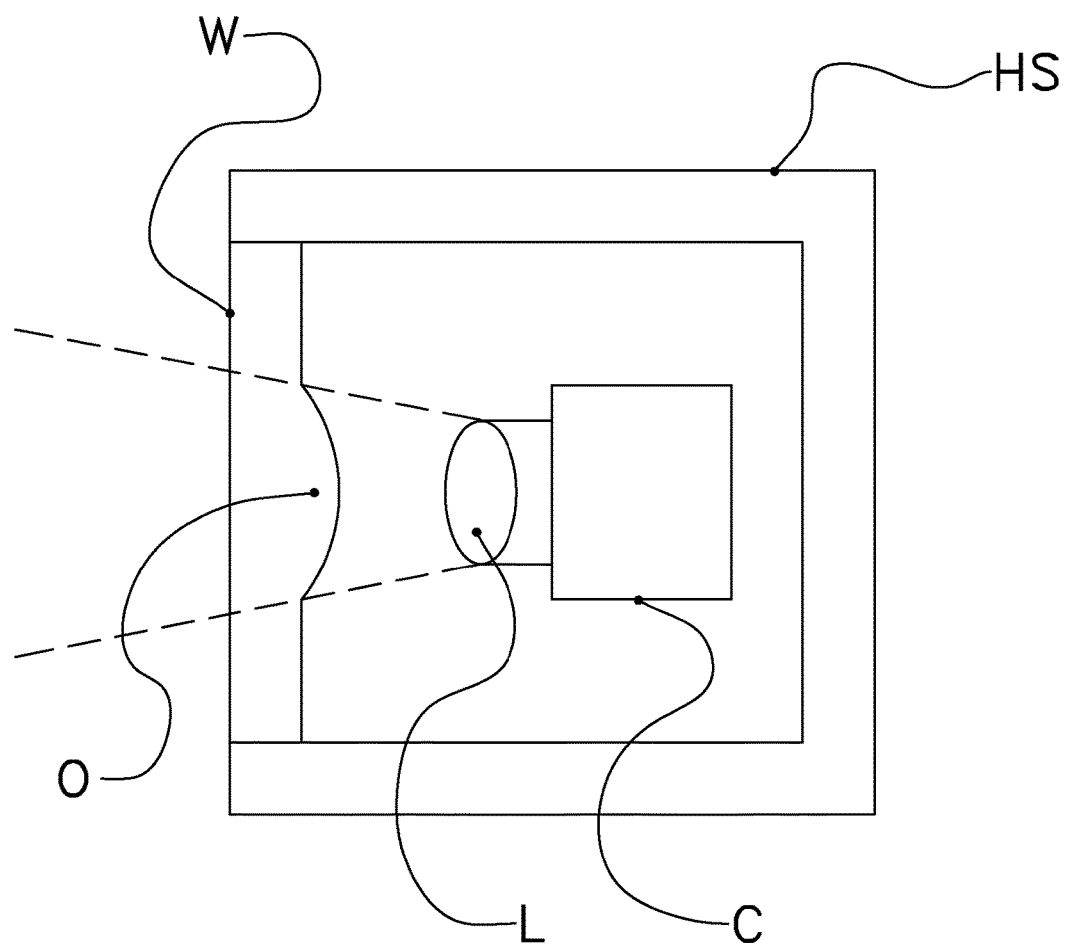
FIG. 2 is a diagram of a part of a measuring device in accordance with the present invention.

FIG. 2 shows an example of a camera C (such as an infrared camera) which is disposed in a housing HS. The camera comprises a lens L through which runs an optical path OP. In order not to impede, or to impede to a limited extent, an observation of infrared radiation by the camera, a part of the housing HS in which the wall W is located is made of an infrared-transparent material, such as a synthetic material. It is also possible for the housing to be entirely made of such a material and to form in this manner, for example, a unit which is closed on all sides.

In order to prevent or to limit a possible attenuation, it is possible for the wall to comprise a thinner part, in which case the optical path runs through the thinner part. It is also possible that an infrared light source is disposed in the housing, which infrared light source may then also be disposed behind the thinner part in order to radiate through the thinner part of the wall during operation.

In order to be able to influence a direction of deflection of infrared radiation, it is possible that at least a part of the wall is lens-shaped, such as denoted by O in FIG. 2.

In order to obtain a whole which is closed as much as possible, and thus to limit the risk of penetration of moisture, there may be disposed in the housing a receiver (such an inductive receiver or an optical receiver) for wireless transfer of electrical energy to the camera. An associated transmitter may then be disposed outside the housing. It is, of course, also possible that there is disposed a photo-electric element in the housing, in which case a power supply of the camera can be supplied with energy by the photo-electric element. Transmission of measurement data or other data may take place in a wireless manner by including a wireless data transmission device in the camera housing.

Thus, the invention has been described by reference to certain embodiments discussed above. It will be recognized that these embodiments are susceptible to various modifications and alternative forms well known to those of skill in the art. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method for automatically milking a dairy animal, comprising a milk implement comprising a measuring device for measuring a position of an object comprising a displaceable element of the milking implement, and for measuring a position of a teat of the dairy animal, and a control device for controlling at least the measuring device, the method comprising the following steps:
   (a) taking at least one measurement, using the measuring device, regarding two points on the object in order to obtain a position information regarding the object, and determining from the measured position information a mutual distance between the points,
   (b) comparing the obtained position information with a known position information regarding the object using the control device, wherein the known position information comprises the known mutual distance between the points, and
   (c) calibrating the measuring device on the basis of the comparison between the obtained position information and the known position information, wherein the control device performs the calibration.

2. The method according to claim 1, wherein step (a) is repeated after a displacement of at least one of the measuring device and the object and wherein the known position information comprises the displacement.

3. The method according to claim 1, wherein the control device in (c) is configured to perform a two-dimensional calibration on the basis of the known mutual distance between the points and the known displacement.

4. The method according to claim 1, wherein step (a) further comprises:

measuring a position information regarding three points on the object, and determining mutual distances between the points on the basis of the measured relative positions, wherein the known position information comprises mutual distances between the points.

5. The method according to claim 1, wherein the known position information is a known distance between the two points.

6. The method according to claim 1, wherein the measuring device is arranged to perform a distance measurement using infrared light, wherein at least an infrared sensor of the measuring device is disposed in a housing having an infrared-transparent wall and wherein an optical path from or to the infrared sensor runs through the wall.

7. The method according to claim 6, wherein the wall is made of a synthetic material.

8. The method according to claim 6, wherein the wall is made as one integral whole.

9. The method according to claim 8, wherein the housing forms a whole which is closed on all sides.

10. The method according to claim 6, wherein the wall comprises a thinner part and an infrared light source is disposed behind the thinner part in order to radiate through the thinner part of the wall during operation.

11. The method according to claim 6, wherein at least a part of the wall is lens-shaped.

12. The method according to claim 6, wherein a receiver is disposed in the housing for wireless transfer of data to the camera.

13. The method according to claim 12, wherein the receiver comprises at least one of an inductive receiver and an optical receiver.

14. The method according to claim 6, wherein a wireless data transmission device is included in the housing for data transmission from or to the camera.

15. The method according to claim 1, wherein the displaceable element comprises at least one of: a teat cup, an assembly of teat cups, and a spraying robot.

* * * * *